United States Patent
Suchak

(10) Patent No.: US 9,440,188 B2
(45) Date of Patent: Sep. 13, 2016

(54) METHOD FOR REMOVING CONTAMINANTS FROM EXHAUST GASES

(71) Applicant: Linde Aktiengesellschaft, Munich (DE)

(72) Inventor: Naresh J. Suchak, Glen Rock, NJ (US)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/121,820

(22) Filed: Oct. 21, 2014

(65) Prior Publication Data
US 2015/0044116 A1    Feb. 12, 2015

Related U.S. Application Data

(63) Continuation-in-part of application No. 13/998,248, filed on Oct. 15, 2013, now Pat. No. 8,865,098.

(60) Provisional application No. 61/713,780, filed on Oct. 15, 2012.

(51) Int. Cl.
    *B01D 53/56*      (2006.01)
    *B01D 53/75*      (2006.01)
    (Continued)

(52) U.S. Cl.
CPC ............. *B01D 53/56* (2013.01); *B01D 53/60* (2013.01); *B01D 53/64* (2013.01); *B01D 53/75* (2013.01); *B01D 53/78* (2013.01); *B01D 53/83* (2013.01); *F01N 3/04* (2013.01); *F23J 15/02* (2013.01); *F23J 15/04* (2013.01); *B01D 53/50* (2013.01); *B01D 2251/104* (2013.01); *B01D 2257/404* (2013.01); *B01D 2257/504* (2013.01); *B01D 2257/602* (2013.01); *B01D 2258/0283* (2013.01); *F01N 2240/38* (2013.01); *F23J 2219/20* (2013.01); *F23J 2219/40* (2013.01); *F23J 2219/50* (2013.01); *F23J 2219/60* (2013.01); *F23J 2900/15003* (2013.01); *Y02T 10/20* (2013.01)

(58) Field of Classification Search
CPC .................. F23J 2900/15003; F23J 2219/20; F23J 2219/40; B01D 53/56; B01D 53/75; B01D 53/78; B01D 2251/104; B01D 2257/404; B01D 2258/0283
See application file for complete search history.

(56) References Cited

U.S. PATENT DOCUMENTS

| | | | |
|---|---|---|---|
| 5,206,002 A | 4/1993 | Skelley et al. | |
| 6,136,284 A * | 10/2000 | Hwang | B01D 53/04 423/235 |
| 6,162,409 A | 12/2000 | Skelley et al. | |
| 6,197,268 B1 | 3/2001 | Hwang et al. | |
| 6,277,347 B1 | 8/2001 | Stearns et al. | |
| 6,649,132 B1 | 11/2003 | Hwang et al. | |
| 6,958,133 B2 | 10/2005 | Hammer et al. | |

(Continued)

FOREIGN PATENT DOCUMENTS

| | | | | |
|---|---|---|---|---|
| EP | 2719440 A1 * | 4/2014 | ............. | B01D 53/56 |
| EP | 1852172 B1 * | 1/2015 | ............. | B01D 53/56 |

*Primary Examiner* — Timothy Vanoy
(74) *Attorney, Agent, or Firm* — Price & Adams

(57) ABSTRACT

An exhaust gas stream from a combustion process is conveyed through a gas distributor at an inlet of a wet horizontal spray scrubber where it is partitioned into a plurality of spaced apart gas streams. The gas stream is partitioned in the scrubber without the need for any physical partitions. A preselected number of the partitioned gas streams are mixed with ozone to oxidize the contaminants. The oxidized gas streams are then sprayed with an aqueous medium to capture the oxidized contaminants and remove them from the treated gas streams. The treated gas streams are then recombined with the untreated gas streams. Excess ozone present in the treated gas streams is consumed by oxidation of contaminants in the untreated gas streams before the combined gas stream is released to the atmosphere.

18 Claims, 8 Drawing Sheets

(51) Int. Cl.
*B01D 53/78* (2006.01)
*B01D 53/60* (2006.01)
*B01D 53/64* (2006.01)
*B01D 53/83* (2006.01)
*F23J 15/02* (2006.01)
*F23J 15/04* (2006.01)
*F01N 3/04* (2006.01)
*B01D 53/50* (2006.01)

(56) References Cited

U.S. PATENT DOCUMENTS

| | | | |
|---|---|---|---|
| 7,303,753 | B2 | 12/2007 | Majmudar |
| 8,444,942 | B2 | 5/2013 | Suchak |
| 8,865,098 | B2 * | 10/2014 | Suchak .................... F23J 15/04 422/170 |
| 2013/0224093 | A1 * | 8/2013 | Xiong .................... B01D 53/60 423/235 |

* cited by examiner

METHOD FOR REMOVING CONTAMINANTS FROM EXHAUST GASES

CROSS REFERENCE TO RELATED APPLICATIONS

The present application is a continuation in part of U.S. patent application Ser. No. 13/998,248 filed Oct. 15, 2013 which claims priority from U.S. Provisional Application No. 61/713,780 filed Oct. 15, 2012.

BACKGROUND OF THE INVENTION

1. Field of the Invention

The present invention relates to an improved method and apparatus for removing contaminants, such as nitrogen oxides, sulfur oxides, particulates, heavy metals and other acid gases, from gas streams arising from chemical, metallurgical, partial and full combustion processes, as for example, exhaust streams generated exhausts from engines or boilers on mobile sources such as sea going, naval or other vessels.

2. Description of the Prior Art

The use of ozone for oxidizing nitrogen oxides is described in U.S. Pat. Nos. 5,206,002; 6,162,409; 6,649,132; and 7,303,735. These chemistries and techniques are directed towards high levels of nitrogen oxides removal (around 90%) and require 1.5 moles of ozone per mole of nitrogen oxide present in the gas stream. Configuring these processes to operate at lower levels of nitrogen oxides removal causes both economic and process challenges.

Combustion and chemical processes generally result in gas streams containing contaminants that need cleanup before being exhausted to the atmosphere. Many industrial processes, power generating utilities, combustion sources, stationary and mobile sources such as engines, boilers, kilns and the like use solid fuels or low cost hydrocarbon fuels that contain sulfur, chlorine, nitrogen and metal compounds in hydrocarbons which result in exhaust gases that contain contaminants such as acid gases, particulate matter and heavy metals. To comply with stricter environmental rules mandated by legislation and a greater concern for the environment, combinations of scrubbing (wet or dry) and particulate capture devices such as electrostatic precipitators (ESP), wet ESP and bag house are increasingly preferred for emissions control of acid gas and particulate matters.

Nitrogen oxides found in most combustion exhaust streams are in the form of nitric oxide (NO), which is mostly insoluble in water and not very reactive. Nitric oxide is not removed by most wet or dry scrubber capture devices. Therefore, to control nitrogen oxides emissions, the two major options are to lower nitrogen oxides formation at the source by modifying combustion or secondly treating nitrogen oxides in the exhaust gas stream using post combustion techniques.

Primary techniques used for reducing nitrogen oxides formation by modifying combustion are low nitrogen oxides burner (LNB), flue gas recirculation (FGR), staged combustion and over fire air (OFA). In most applications these technologies are not adequate for removing nitrogen oxides from combustion gas streams and post combustion techniques, such as selective catalytic reduction (SCR) and selective non-catalytic reduction (SNCR), become necessary to achieve the desired nitrogen oxides reduction.

Both SCR and SNCR processes realize good results but also have limitations. Ozone based oxidation technologies have recently gained success as an alternative post combustion technique, especially when an application is not suitable for SCR. Ozone based processes as described in U.S. Pat. Nos. 6,162,409, 5,206,002 and 7,303,735 provide multi-pollutant removal approaches and they have been implemented on flue gases that arise from gas and coal fire boilers removing multiple pollutants including nitrogen oxide, sulfur oxides, particulates, etc. Ozone based processes are also industrially practiced in lowering emissions in other applications such as metal pickling processes, fluidized catalytic cracker (FCC) regenerators, metal recovery furnaces and sulfuric acid manufacture.

Coal fired boilers with low nitrogen oxides burners and staged combustion often attain nitrogen oxides in 0.25 to 0.4 lb/MMBTU cost effectively whereas regulations require nitrogen oxides emissions in a range of 0.1 to 0.15 lb/MMGBTU i.e., post combustion technology that can cost effectively offer 40 to 70% reduction.

The methods disclosed in U.S. Pat. Nos. 6,162,409, 5,206,002, 6,649,132 and 7,303,735 use chemistry of nitrogen oxides reaction with ozone by forming higher oxides of nitrogen, especially the pentavalent form or higher which are quite water soluble and readily removed by wet scrubbing. The stoichiometric amount of ozone required to convert one mole of $NO_x$, in the form of NO, to the pentavalent form is about 1.5 moles of ozone and 0.5 moles if $NO_x$ is in the form of $NO_2$.

The process disclosed in U.S. Patent Application Publication No. 2014/0127107 is an improvement over the above-identified prior art patents by splitting the gas stream into at least wo or more streams and treating at least one stream with ozone for oxidizing $NO_x$ and other contaminants, capturing oxidized contaminants in a scrubber or any other capture device, and then recombining streams substantially free from oxidized contaminants with one stream that has not been treated with ozone. Splitting streams requires simple hardware, such as partitioned ductwork or capture devices, and in specific applications utilizes specialized gas handling equipment.

While the ozone based methods for removing nitrogen oxides from combustion streams are effective at achieving ultra low levels of nitrogen oxides emissions in the treated gas stream, there is need for an improved process that efficiently and economically cleans exhaust gas streams containing contaminants such as particulates, acid gases ($SO_x$, HCl and $NO_x$) and heavy metals for the entire spectrum of $NO_x$ removal requirement without physically partitioning the gas stream in a scrubber.

SUMMARY OF THE INVENTION

In accordance with the present invention there is provided a method for the partial removal of contaminants from a process gas stream that includes the steps conveying a process gas stream containing contaminants to an inlet of a scrubber. The process gas stream is distributed evenly across the scrubber inlet. At the scrubber inlet is formed a flow pattern of a plurality of process gas streams partitioned from one another. Ozone is fed into contact with selected ones of the partitioned gas streams in the scrubber to oxidize contaminants in the partitioned gas streams. The oxidized contaminants are removed from the selected partitioned gas streams. The selected partitioned gas streams substantially free of contaminants are recombined with the remaining partitioned gas streams containing contaminants.

Further in accordance with the present invention there is provided a method for the partial removal of contaminants from a process gas stream that includes the steps of conditioning the process gas stream emitted from a combustion process. The process gas stream is separated into a plurality of spaced apart, partitioned gas streams containing contaminants. Ozone is injected into one or more of the partitioned gas streams to mix ozone with the contaminants in a preselected percentage of the entire process gas stream. The contaminants in the selected partitioned gas stream are oxidized by mixing with ozone. The oxidized contaminants are captured in a separation device to remove the contaminants from the selected partitioned gas stream. The selected partitioned gas stream substantially free of contaminants is reunited with the remaining partitioned gas streams containing contaminants.

In addition with the present invention there is provided apparatus for the partial removal of contaminants from a process gas stream that includes a scrubber having an inlet and an outlet with a chamber positioned therebetween. The chamber is free of any obstruction diverting the flow of the process gas stream from the inlet through the chamber to the outlet. A gas distributer is positioned at the inlet for receiving and evenly distributing the process gas stream across the inlet entering the chamber into a flow pattern of separated gas streams extending from the inlet to the outlet. A source of ozone is positioned at the inlet for injecting ozone into selected ones of the separated gas streams to oxidize a preselected percentage of the gas stream flowing through the chamber. A capture device positioned in the chamber receives the oxidized gas streams before exiting through the outlet to remove the oxidized contaminants from the gas streams. The outlet receives the gas stream free of contaminants for mixing with the gas stream containing contaminants.

A principal object of the present invention is to provide method and apparatus that efficiently and economically removes contaminants such as $NO_x$ from the exhaust gases generated by combustion processes in a scrubber without the need to physically partition the scrubber to form separated gas streams that can be selectively treated for removal of the contaminants.

Another object of the present invention is to provide method and apparatus for removing contaminants in the form of nitrogen oxides and $SO_x$ from combustion exhaust streams using a scrubber device that achieves a selected percentage of reduction in the contaminants from the exhaust gas stream by partitioning the gas stream and treating selected ones of the partitioned gas streams with ozone without the requirement of physically partitioning the scrubber chamber.

These and other objects of the present invention will be more completely disclosed and described in the following specification, accompanying drawings and the appended claims.

DETAILED DESCRIPTION OF THE INVENTION

Figure 1:
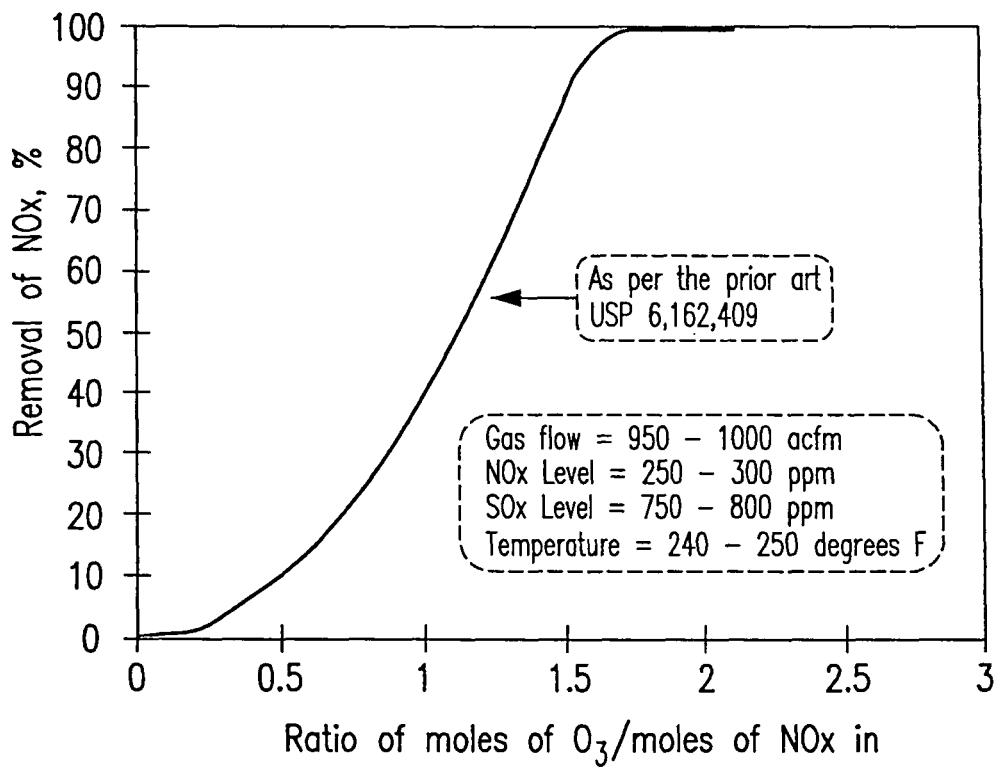
FIG. 1 is a graph, illustrating nitrogen oxides removal versus molar ratio of ozone to nitrogen oxides.

The present invention provides for the oxidation of nitrogen oxides and other contaminants by the addition of ozone to a separated portion of the process gas stream. The total process gas or flue gas stream is divided into at least two or more streams. The portion of the total process gas stream that is to be treated with ozone is determined based on the extent of nitrogen oxides removal desired. For purposes of illustration, to remove 60% of the nitrogen oxides from the process gas stream, approximately 60% of the gas stream may be mixed with ozone and treated by the methods of the invention.

Nitrogen oxides generated in combustion processes are mostly in the form of NO which has negligible solubility in water. By adding ozone to the exhaust gas stream, nitrogen oxides can be oxidized to higher forms. Solubility of nitrogen oxides increases with the degree of oxidation. Higher oxides such as $N_2O_5$ and oxyacids are not only very soluble but also highly reactive and they can be removed in dry, semi-dry and wet scrubbing equipment along with other contaminants present in the exhaust gas stream so treated.

Although various methods as disclosed by the prior art are effective in achieving ultra low levels of nitrogen oxides emissions, when applied to removing only a portion of the nitrogen oxides present in the exhaust gas stream, they will generate appreciable amounts of $NO_2$ which is not quantitatively removed in the capture device employed. It is well understood that only when nitrogen oxides are oxidized beyond $NO_2$ to higher oxides such as $N_2O_5$, quantitative removal occurs in industrially used capture devices.

Nitrogen oxides oxidation to $N_2O_5$ involves many reactions but for the sake of brevity, it can be simplified as follows:

$$NO + O_3 \rightarrow NO_2 + O_2 \text{ (very fast)} \qquad (1)$$

$$NO_2 + O_3 \rightarrow NO_3 + O_2 \text{ (slow)} \qquad (2)$$

$$NO_2 + NO_3 \leftrightarrow N_2O_5 \qquad (3)$$

The reaction (1) is an order of magnitude faster when compared to reaction (2). By the time reaction (2) starts to occur, most of the NO is oxidized to form $NO_2$. Therefore, reactions (1) and (2) are somewhat consecutive reactions.

Nitrogen dioxide ($NO_2$) has relatively low solubility in water, so unless the reaction is brought forward to the formation of oxides higher than $NO_2$, removal of nitrogen oxides in a wet scrubber remains very limited. On the other hand, $N_2O_5$ is extremely soluble and with moisture present in the gas stream. As a result, $N_2O_5$ forms $HNO_3$ which is soluble with water in all proportions. Therefore, any capture device, wet scrubber, wet ESP or any device with wet surfaces such as a condenser or coalescing device such as a mist eliminator will remove $HNO_3$ and $N_2O_5$ quantitatively with or without any reagent present in the aqueous phase.

The highly oxidized forms $HNO_3$ and $N_2O_5$ are also very reactive and are removed using most common reagents and adsorbents industrially used in dry and semi-dry scrubbing. $N_2O_5$ and $HNO_3$ are also removed in fabric filter by adsorption on particulate matters in a capture device such as bag house.

The stoichiometric amount of ozone required to convert one mole of NO and $NO_2$ to pentavalent form namely $N_2O_5$ and/or $HNO_3$ is about 1.5 and 0.5 moles respectively. In the majority of combustion processes, nitrogen oxides are predominantly in the form of NO. In fact by and large, most nitrogen oxides emitted from various types of sources is in the form NO.

FIG. 1 depicts the removal of nitrogen oxides versus the ratio of moles of ozone to moles of nitrogen oxides in the exhaust gas from a coal fired boiler. This figure, which appears in U.S. Pat. No. 6,162,409, shows the overall stoichiometric ratio of 1.5 moles of ozone required per mole of nitrogen oxides for greater than 90% nitrogen oxides removal. This ozone requirement is per mole of nitrogen oxides present in the gas stream and not per mole of nitrogen oxides removed.

When only a partial amount of nitrogen oxides reduction is required, ozone required per mole of nitrogen oxides removed far exceeds 1.5. To remove 50% of nitrogen oxides (mostly as NO) a series of reactions must occur. When the ozone is added and thoroughly mixed in the gas stream, ozone first reacts with NO present in the nitrogen oxides to convert to $NO_2$. Only after almost all of the NO is oxidized does $NO_2$ oxidation to $N_2O_5$ begin.

To achieve 50% removal with two moles of nitrogen oxides present in the gas stream, one mole of nitrogen oxides need to be removed. For this 50% removal example, with two moles of nitrogen oxides in the form of NO, two moles of ozone are required to convert to two moles of $NO_2$ as per reaction (1) above. Since $NO_2$ is only partially soluble, in order to achieve 50% removal, one mole out of two moles of $NO_2$ must be converted to a pentavalent form. Therefore an additional 0.5 moles of ozone is required to convert one mole of $NO_2$ to a pentavalent form $N_2O_5$. Thus the total ozone requirement is 2.5 moles per mole of nitrogen oxides removed when the nitrogen oxides targeted removal is only 50%.

As disclosed in U.S. Pat. No. 6,162,409, the data used in FIG. 1 is plotted in FIG. 2 as nitrogen oxides removal versus ratio of mole of ozone consumed to moles of nitrogen oxides removed in the exhaust gas from a coal fired boiler. It is well illustrated that the moles of ozone required per mole of nitrogen oxides removed increases with the decrease in nitrogen oxides removal. For 50% nitrogen oxides removal, the molar ratio of ozone consumed to nitrogen oxides removed is closer to 2.5. In essence, the nitrogen oxides reaction with ozone and removal by a capture device was oversimplified in this example but detailed enough to show the limitation of the prior art process. The partial removal of nitrogen oxides with these earlier processes has limitations which the present invention overcomes.

The merits of a nitrogen oxides removal process are evaluated with respect to many attributes of which there are four fundamental ones. First, what level of nitrogen oxides removal can the process achieve? Second, how affordable are the ownership costs in both capital and operating terms per ton of nitrogen oxides removed (cost effectiveness)? Third, are secondary emissions within acceptable limits? Fourth, how compatible is nitrogen oxides removal process with removal of other contaminants?

Figure 2:
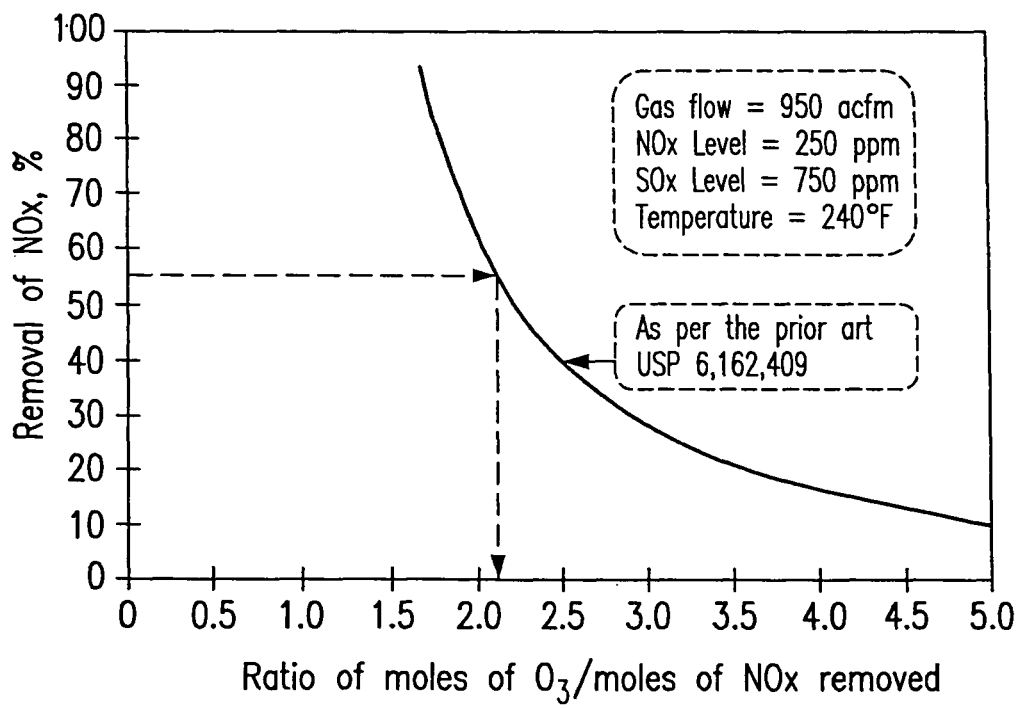
FIG. 2 is a graph, illustrating nitrogen oxides removal versus molar ratio of ozone to nitrogen oxides removed.

The limitations that the prior art processes fall short in measuring up to the second and third attributes. Ozone is a costly commodity. The amount of ozone required per unit of nitrogen oxides removal increases rapidly with reduction in nitrogen oxides removal requirement. Half a century ago, most countries in the world did not have mandatory requirement of reducing nitrogen oxides emissions. As air quality worsened due to increasing air emissions, governmental bodies put in place environmental regulations that mandated the gradual lowering of nitrogen oxides emissions. In the initial phase of implementation of these regulations, the nitrogen oxides reduction from fixed sources such as industrial boilers, power generation systems, combustion processes as well as mobile sources such as ships, barges, etc. are modest. The prior art processes use significantly greater amounts of ozone per unit of nitrogen oxides removed at low or modest nitrogen oxides reduction requirements, as it is depicted in FIG. 2, and offer poor cost effectiveness thereby falling short with respect to the second attribute. The prior art processes are directed toward very high nitrogen oxides reduction requirements.

At low or modest nitrogen oxides reduction requirements, using methods disclosed in the prior art, the ozone treated gas stream also has significantly higher $NO_2$ content. Nitrogen dioxide is brown in color and increases the opacity of the exhaust. The large stationary sources, such as fossil fuel or biomass fired boilers or combustion sources, have huge exhaust streams and are vulnerable to default on opacity specifications by not satisfying the third attribute above.

The rate at which nitrogen oxides and ozone react is dependent on the kinetic rate constant, as well as the concentration of nitrogen oxides and ozone. With a decrease in concentration, the rate of reaction also decreases. As described earlier in the 50% nitrogen oxides removal case, 2.5 moles of ozone is required per mole of nitrogen oxides removed. The reaction (1) above is very fast and consumes two moles of ozone leaving only 0.5 moles of ozone for the slower reaction (2). In order to achieve the required oxidation, either the exhaust gas stream processing vessel must be large enough to provide the necessary residence time between $NO_2$ and ozone or excess ozone must be added, which may result in some residual ozone in the treated flue gas that is not consumed in the scrubbing process.

Partial nitrogen oxides removal, per the prior art processes, is achieved at sub-stoichiometric ratios of ozone and oxidized stream having a mixture of $N_2O_5$ and $NO_2$. Scrubbing removes all $N_2O_5$ and some $NO_2$ On scrubbing $N_2O_5$ only nitrate is formed; whereas, scrubbing $NO_2$ forms a mixture of nitrite and nitrate of alkali or alkaline earth metals. The presence of nitrite in the scrubber purge is undesired and poses challenges in handling and treating liquid streams in the effluent treatment plant.

When the flue gas also has sulfur oxides present in it, $SO_2$ absorption produces sulphite in the scrubbing medium. Sulphite is an ozone scavenger and helps to eliminate excess ozone in wet scrubbing devices. $NO_2$ also reacts with sulphite when it is present in large concentrations and depletes sulphite potentially creating conditions for ozone slip. In lime and limestone based reagents, large concentrations of $NO_2$ also affect sulfur oxides removal adversely thus not satisfying the fourth attribute.

In accordance with present invention, the amount of the process gas stream to be treated for nitrogen oxides removal is about the same percentage as the amount of nitrogen oxides removal. For example, if the operator wishes to remove 60% of the nitrogen oxides in a flue gas stream, then the operator will treat 60% of the total flue gas stream with ozone. The operator thereby separates the primary flue gas stream into two or more gas streams where at least one stream totals 60% of the total process gas stream by volume.

An operator can conceivably treat two streams that total 60% of the total (30% and 30%) or three or more streams as long as the total percentage of treated streams is approximately equal to the percentage reduction in nitrogen oxides content for the entire process gas stream.

The portion of the gas stream that is oxidized with ozone proceeds along the reactions (1) to (3), as described above. The amount of ozone is based on the amount of nitrogen oxides in that portion of gas stream. A slight excess of stoichiometric requirement may be added to reduce the reaction time requirement. Nitrogen oxides in combustion flue gas streams are generally in the form of NO (divalent) and, therefore, stoichiometric requirement is 1.5 moles of ozone per mole of nitrogen oxides. However, when nitrogen oxides in the gas stream is from chemical or other sources and is a mixture of divalent (NO) and tetravalent ($NO_2$) forms, the stoichiometric requirement is then 1.5 moles of ozone per mole of divalent form and 0.5 moles of ozone per mole of tetravalent form.

Prior to mixing ozone, all or a portion of the gas stream to be mixed may be scrubbed, pre-scrubbed, selectively pre-scrubbed, quenched or conditioned as required. With respect to temperature, the optimum condition for oxidations is 40° F. to 225° F. in the gas stream. Preferably, the gas stream may be droplet free or free from excessive mist of the aqueous medium, if sulfur oxides are also present in the flue gas stream. Ozone is not added to the balance of the gas stream.

The oxidized contaminants in the ozone treated portion of the stream are removed by contacting with a scrubbing medium in a wet or semi-dry or dry scrubber. The oxidized contaminants, especially nitrogen oxides, are highly soluble in water and very reactive and, therefore, may also be removed in the aqueous medium on condensing or coalescing surfaces, such as heat exchangers or droplet separators. Alternatively, they may be captured in fabric filter (bag house), ESP (electrostatic precipitator), WESP (wet electrostatic precipitator), etc. Oxidized nitrogen oxides are converted to oxyacids, such as nitric acid and nitrous acid and salt.

The chemistry of this dissolution and stabilization of nitrogen oxides in the form of oxyacids and salts is described below.

$$N_2O_5 + H_2O \rightarrow 2HNO_3 \quad (4)$$

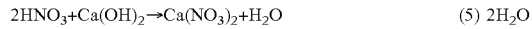
$$2HNO_3 + Ca(OH)_2 \rightarrow Ca(NO_3)_2 + H_2O \quad (5)\ 2H_2O$$

$$HNO_3 + NaOH \rightarrow NaNO_3 + H_2O \quad (6)$$

For treating a portion of the process gas stream with ozone, the existing scrubber and APC (air pollution control) device may be modified simply by portioning the duct and/or scrubber while ensuring the oxidized portion of stream is contacted adequately with a scrubbing medium and contaminants are captured prior to unifying the portion of the stream with the balance of gas stream not treated with ozone.

When the ozone treated portion of the gas stream is reunited with the rest of the gas stream that is untreated, small amounts of excess ozone from the treated stream are instantaneously consumed in the recombined stream. An extremely fast oxidation reaction results, as stated in equation (1) above. Thus, the reunited stream ceases to have any residual ozone. Also, due to excess ozone present in the treated stream, almost all of the nitrogen oxides are oxidized to their pentavalent form and captured quantitatively in the capture device with insignificant amounts of leftover $NO_2$.

The present invention also provides the capability of an ozone free stack when high nitrogen oxides removal is desired. For example, for 90% nitrogen oxides removal, 10% of the untreated stream is mixed with 90% treated stream and residual ozone from the 90% treated stream is destroyed by the untreated nitrogen oxides present in the 10% gas stream.

The present invention provides a method and apparatus for the removal of contaminants such as nitrogen oxides in a relatively safe manner that does not cause secondary emissions and requires less ozone. Further, the present invention allows for the implementation of nitrogen oxides reduction in phases to match regulations that mandate a drop in nitrogen oxides emissions over time. Phase 1 might mandate a 30 to 35% nitrogen oxides reduction, while phase 2 mandates 60 to 65% reduction, and phase 3 requiring a 90 to 95% reduction. With the methods of the present invention, these mandated reductions are reached in a cost effective manner.

The processes of the present invention lower $NO_2$ emissions in the treated gas stream being exhausted to the atmosphere and the opacity of the plume irrespective of nitrogen oxides reduction required. In this manner residual ozone in the treated gas stream is eliminated and consequently ozone slip is inhibited. Ozone usage is optimized when partial nitrogen oxides reduction is performed. The present invention significantly lowers residence time requirement for effective nitrogen oxides oxidation without compromising efficiency and without causing ozone slip. Improved scrubber chemistry results, and consequently sulfur oxides removal efficiency is retained by inhibiting sulfite destruction in the scrubbing medium by $NO_2$. Thus, the methods of the present invention provide cost effective treatment when a gradual or stage wise implementation of nitrogen oxides abatement is performed.

Figure 3:
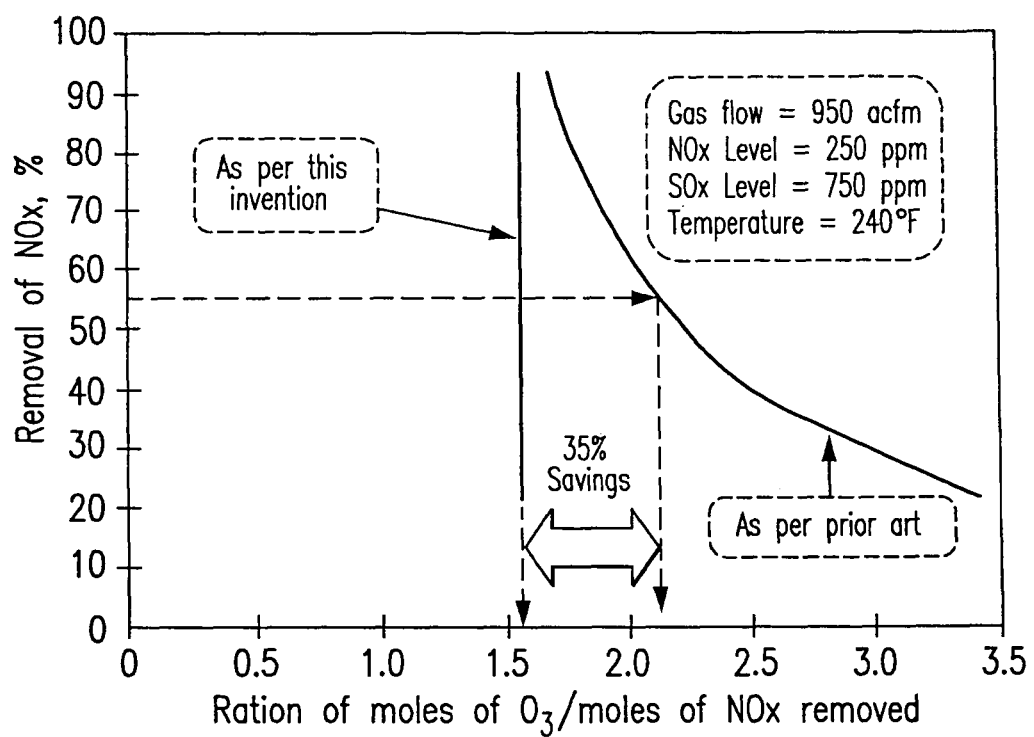
FIG. 3 is a graph, illustrating nitrogen oxides removal versus molar ratio of ozone to nitrogen oxides removed.

As illustrated in FIG. 3, unit ozone consumption per mole of nitrogen oxides removed remains almost identical. The consumption of ozone is 35% less in lowering 55% of the nitrogen oxides content compared with the prior art processes described above under identical conditions.

In addition to savings in the amount of ozone consumed, the present invention creates a dry exhaust stack, when a portion of the gas stream is not scrubbed and was thereby not saturated with water vapor. This eliminates any residual ozone and contains very low $NO_2$ content in the remaining nitrogen oxides. Since most of the nitrogen oxides absorbed is $N_2O_5$, only nitrate is formed in the scrubbing medium.

Figure 4:
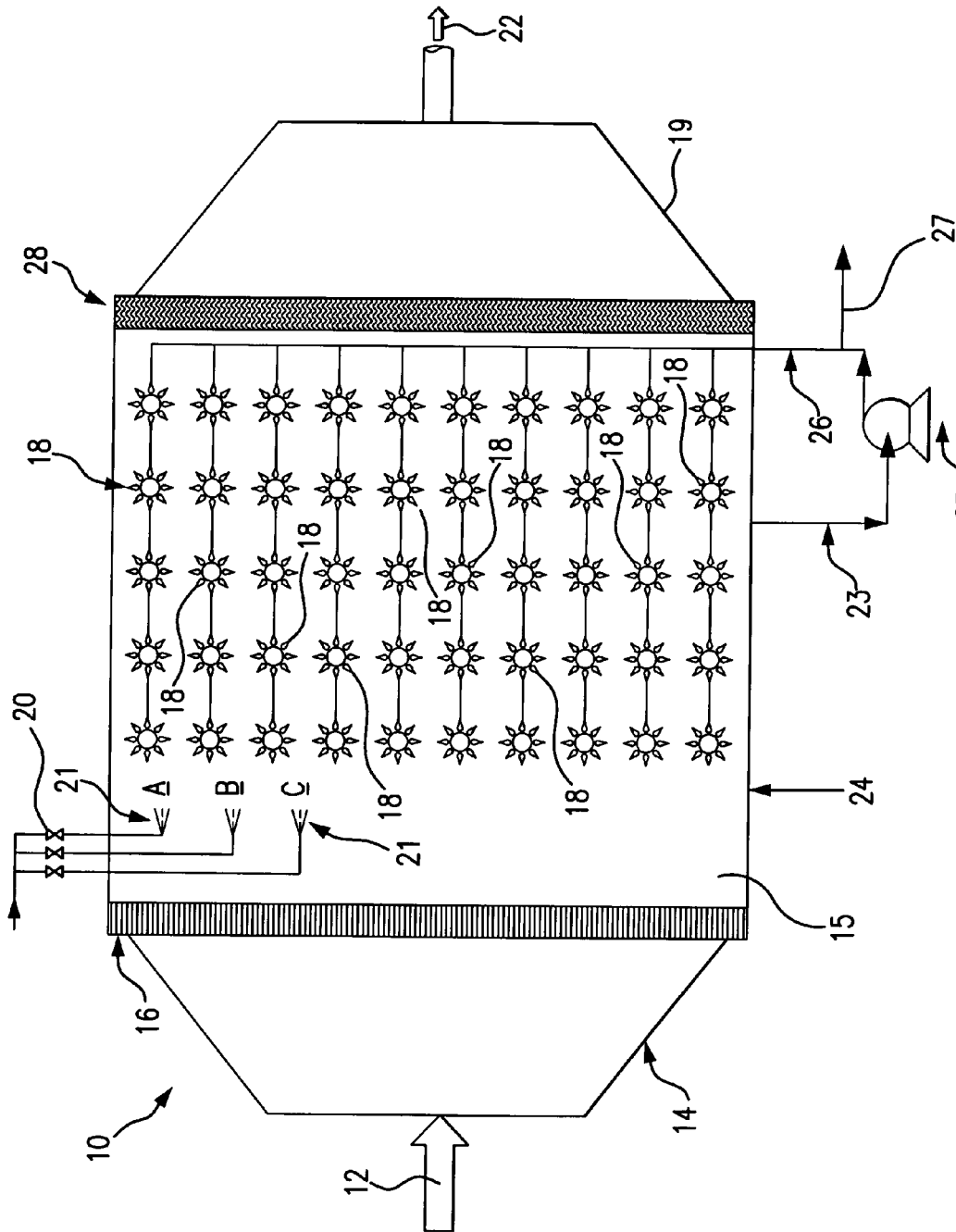
FIG. 4 is a system flow diagram of a process for the oxidation of nitrogen oxides in a non-partitioned spray scrubber.

Referring to FIG. 4 there is schematically illustrated a wet horizontal spray scrubber 10 for receiving a process gas stream 12 from, for example, a coal fired boiler for the removal of $NO_x$ and $SO_x$ contaminants. In accordance with environmental regulations, the $NO_x$ emissions must be limited to below 0.15 lb. of $NO_x$ per million British Thermal Unit (MMBTU) of heat input. With the use of available lower cost combustion modification technologies, such as Low $NO_x$ Burners (LNB), combustion staging, over fire air (OFA), $NO_x$ levels in the flue gas can be lowered to approximately 0.22 to 0.45 lb. of $NO_x$ per MMBTU. Although the cost of ozone generation equipment and power requirements are substantial, the present invention facilitates incremental $NO_x$ reduction to 0.15 lb./MMBTU in a cost effective manner to meet the regulatory requirements.

As illustrated in FIG. 4, the untreated process gas stream 12 is conveyed through an inlet section 14 of the scrubber 10 into scrubber chamber 15. If required, the process gas stream containing contaminants may be conditioned prior to introduction into the scrubber 10. Preliminary to introduction into the scrubber 10 the process gas stream may be cooled, quenched, prescrubbed or selectively scrubbed of contaminants, such as $SO_x$, HCl, $Cl_2$, HF, and $H_2S$.

The scrubber inlet section 14 includes a gas distributer 16 that extends the full width of the inlet section 14. The gas distributer 16 functions to evenly distribute the gas stream 12 into discrete partitioned gas streams that are separated from one another at the inlet to the scrubber 10. The gas streams are thus divided or partitioned from one another evenly the entire width of the inlet section 14. The scrubber chamber 15 is free of any physical obstruction to partition the chamber. Physical partitions are not required to be installed in the scrubber chamber 15 to achieve partitioning of the process gas stream.

Partitioning of the gas stream forms a plurality of scrubbing zones within the scrubber chamber 15. With a horizontal spray scrubber as shown in FIG. 4, the gas flows the length of the scrubber in only one direction, which is typical for horizontal scrubbers. The flow of gas in each partitioned gas zone is fixed in length based on the required removal efficiency of the contaminants. Also, the width of the scrubber 10 varies based on the gas handling capacity required for the scrubber.

In the embodiment of the horizontal scrubber 10 shown in FIG. 4, ten rows of scrubbing nozzles 18 are positioned in a parallel array, each equally spaced apart the width of a scrubber 10. Any number of rows of scrubbing nozzles can be utilized in the scrubber, as determined by the size of the scrubber and the operating range of the gas flow. The number of rows of the scrubbing nozzles 10 is also determined by dispersion studies based on mathematical modeling and residence time analysis. In this manner, a flow pattern of discrete, partitioned gas streams is formed across the width of the scrubber to flow the length of the scrubber from the inlet section 14 to an outlet section 19.

As discussed above, the process gas stream may be pre-conditioned before it enters the inlet section 14 and is partitioned into discrete gas streams. The partitioning of the process gas stream entering the separator 10 is accomplished without the need for physical barriers or structure in the chamber 15 to divide the gas stream into a partitioned flow pattern. The partitioning of the gas stream is accomplished by the gas distributor 16. Consequently, the pattern of gas flow through the chamber 15 of the scrubber 10 is in a plug flow-type manner. The design of the partitioned gas flow is accomplished by plotting velocity and concentration profiles using Computational Fluid Dynamics (CFD) software for the given geometry of the scrubber 10 and the velocity of the process gas stream entering the scrubber 10.

As illustrated in FIG. 4, ozone from a source is introduced into the scrubber 10 by an injection system 20 including ducts connected to nozzles 21. Any number of nozzles 21 can be positioned downstream of the gas distributor 16. Each nozzle 21 is positioned oppositely of a partitioned process gas stream. As shown in FIG. 4, three nozzles 21 are positioned to inject ozone into three of the ten partition gas streams, identified as Zones A, B, and C. Ozone is injected from nozzle 21 into each zone. The zones are separately treated. Consequently, thirty percent (30%) of the process gas stream entering the scrubber 10 is treated. The number of partitioned process gas streams that are injected with ozone from nozzles is selective. For example, any combination of the partitioned gas streams may be selected for the injection of ozone from nozzles positioned oppositely of the rows of scrubber nozzles 18.

The exact number of nozzles and the quantity of ozone injected into the partitioned process gas stream is determined by the $NO_x$ content and the removal thereof that is required. With this arrangement a selected portion of the process gas stream is treated without constructing within the scrubber chamber 15 physical partitions or barriers. The process gas stream is partitioned off by the gas distributor 16. Then a number of the partitioned gas streams is selected for removal of contaminants. For a gas stream with 0.2 to 0.25 lb. per MMBTU $NO_x$ content requiring $NO_x$ reduction to 0.15 lb. per MMBTU in outlet stream 22 from the outlet section 19, approximately thirty percent (30%) of the gas entering the scrubber 10 is admixed with ozone.

As discussed above, the gas distributer 16 is operable to partition the untreated process gas stream entering the scrubber inlet section 14 into a plurality of discrete, separated gas streams to create a plurality of partitioned gas streams that extend in parallel spaced relation, the width of the scrubber 10 from the inlet section 14 to the outlet section 19. Each partitioned gas stream forms a zone, and selected zones are oxidized by injecting ozone from the injection system 20 into the scrubber 10. With the embodiment shown in FIG. 4, injection zones A, B, and C are formed and the injection system 22 delivers ozone to the injection nozzles 21 for each zone.

The injection nozzles 21 inject ozone into the zones A, B, and C for mixing with the partitioned gas streams therein forming oxidation zones A, B, and C. Contaminants, such as $NO_x$, Hg, and others, are quickly oxidized in zones A, B, and C prior to reaching the array of scrubbing nozzles 18. The oxidized contaminants, such as $N_2O_5$, and $HNO_3$ are readily captured in the aqueous sprays, along with $SO_x$, HCl, and other contaminants from the nozzles 18. If the scrubber volume upstream of the oxidation zones A, B, and C is inadequate, the residence time required to obtain substantially complete removal of $NO_x$ from the processed gas stream can be compensated by increasing the volume of ozone that is injected into the partitioned gas streams.

The scrubbing nozzles 18 are supplied with an aqueous medium 23 from a sump 24 via pump 25 through a header spray assembly 26 to the array of scrubber nozzles 18 in each of the partitioned process gas streams. The aqueous medium is preferably made up of water, reagents such as lime, limestone, soda ash, caustic alkali, alkaline earth metal, ammonia hydroxides, carbonates, bicarbonates, and mixtures thereof. The scrubbing medium from the sump 24 maybe continuously or intermittently purged by stream 27 to maintain dissolved and suspended solids within the operating range. Nitrogen oxides scrubbing is slightly affected by pH in the range of 2 to 14 or by the presence of dissolved or suspended solids content. Other known parametric controls, such as pH control and purge controls, can also be utilized. In a typical limestone based wet Flue Gas Desulphurization (FGD), a scrubber sump is fitted with an air sparger to oxidize calcium sulfite to sulfate.

The oxidized gas streams in oxidation zones A, B, and C and the untreated gas streams from the other partitioned zones flow through a mist removal/droplet separation device 28 where fine droplets of mist from the processed gas stream are removed. The partitioned gas streams pass through the mist separation device 28 into the scrubber outlet section 19 where the partitioned gas streams are reunited. The treated gas stream 22 exits the scrubber outlet 19 to the atmosphere. Any residual ozone present in the treated gas stream 22 is immediately consumed by $NO_x$ remaining in the treated gas stream 22.

Treating a processed gas stream by the partitioning of the process stream using the above-described spray scrubber consumes thirty-five percent (35%) less ozone in lowering the $NO_x$ content from 0.2 to 0.25 lb./MMBTU to 0.15 lb./MMBTU compared to what is known with the prior art devices under identical conditions and is achieved by the virtual partitioning of the gas stream in the scrubber without requiring the construction of physical partitions or barriers as disclosed in U.S. Patent Application Publication No. U.S. 2014/0127107.

Figure 5:
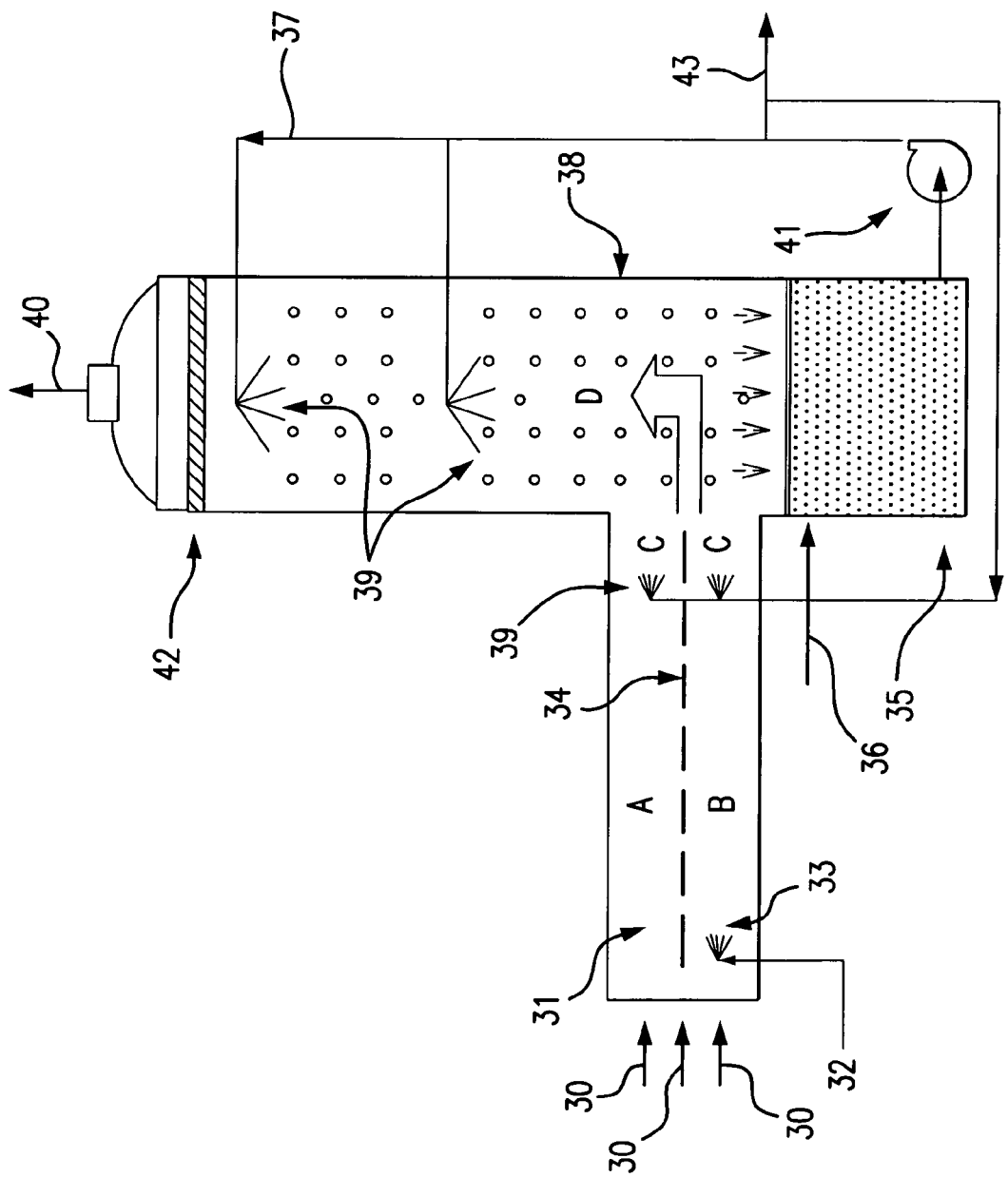
FIG. 5 is a system flow diagram of a process for the oxidation of nitrogen oxides in a partitioned duct.

Referring now to FIG. 5, there is schematically illustrated a vertical flue gas scrubber for the oxidation of nitrogen oxides in a partitioned duct. An untreated gas stream 30 is conveyed through duct 31 to a wet spray scrubber 38. With this embodiment of the present invention, the duct 31 is physically partitioned to treat a portion of the gas stream 30. Partition 34 divides duct 31 into two equal zones, A and B. Ozone from duct 32 is emitted from nozzle 33 for mixing with the gas stream in Zone B. Contaminants, including nitrogen oxides, are completely oxidized in the Zone B prior to contact with aqueous medium sprays from nozzles 39 connected to header spray assembly 37 in Zone C. Oxidized contaminants from Zone B, such as $N_2O_5$ and $HNO_3$, are readily captured in aqueous sprays in Zone C. The gas stream exiting from both Zones C is remixed in the bottom section of the scrubber 38. If required, the residence time requirement can be compensated for by using a slight excess of ozone. If the volume of the duct (Zones A and B) is insufficient or if the duct cannot be partitioned, then the bottom portion of the scrubber 38 may be partitioned to create Zones A and B for oxidation. If sulfur oxides are also present, the internal arrangements in the scrubber may be made necessary to avoid droplets from the spray section falling into the oxidation zone. If the physical partitioning of the bottom of the scrubber 38 is not an option, then ozone can be introduced in the section of the bottom if the oxidized portion of the gas stream rises to the scrubbing section vertically without mixing with remaining gas stream. In this manner a selective portion of gas stream is treated without physically partitioning gas flow. With the help of modern flow modeling tools, such as computational fluid dynamics (CFD), it is now possible to ensure that a substantial part of ozone mixed portion remains isolated until oxidized $NO_x$ is captured in the scrubbing section. The present invention can also be practiced without physically separating the gas stream for treating with ozone as discussed above and disclosed in FIG. 4.

As further illustrated in FIG. 5, the scrubber 38 is sprayed with an aqueous medium 36 from a sump 35 via pump 41 through the header spray assembly 37 and spray nozzles 39. Scrubbing medium sprayed in the gas stream removes remaining contaminants such as $SO_2$, HCl, etc. The sump 35 is supplied with an aqueous medium 36 made up of water, reagents, etc. Part of the scrubbing medium may be continuously or intermittently purged by stream 43 to maintain dissolved and suspended solids within the operating range. Nitrogen oxides scrubbing is insignificantly affected by pH in the range of 2 to 14 or the presence of dissolved or suspended solids content and, therefore, other parametric controls, such as pH control and purge control, are not described in detail herein. The scrubbed gas stream in the scrubber column 38 then flows through the mist removal/droplet separation device 42 and exits to the atmosphere treated gas as stream 40 from the outlet of scrubber 38. In a typical limestone based wet flue gas desulfurization (FGD), scrubber sump 35 is fitted with an air sparger, not shown, to oxidize calcium sulfite to sulfate.

Figure 6:
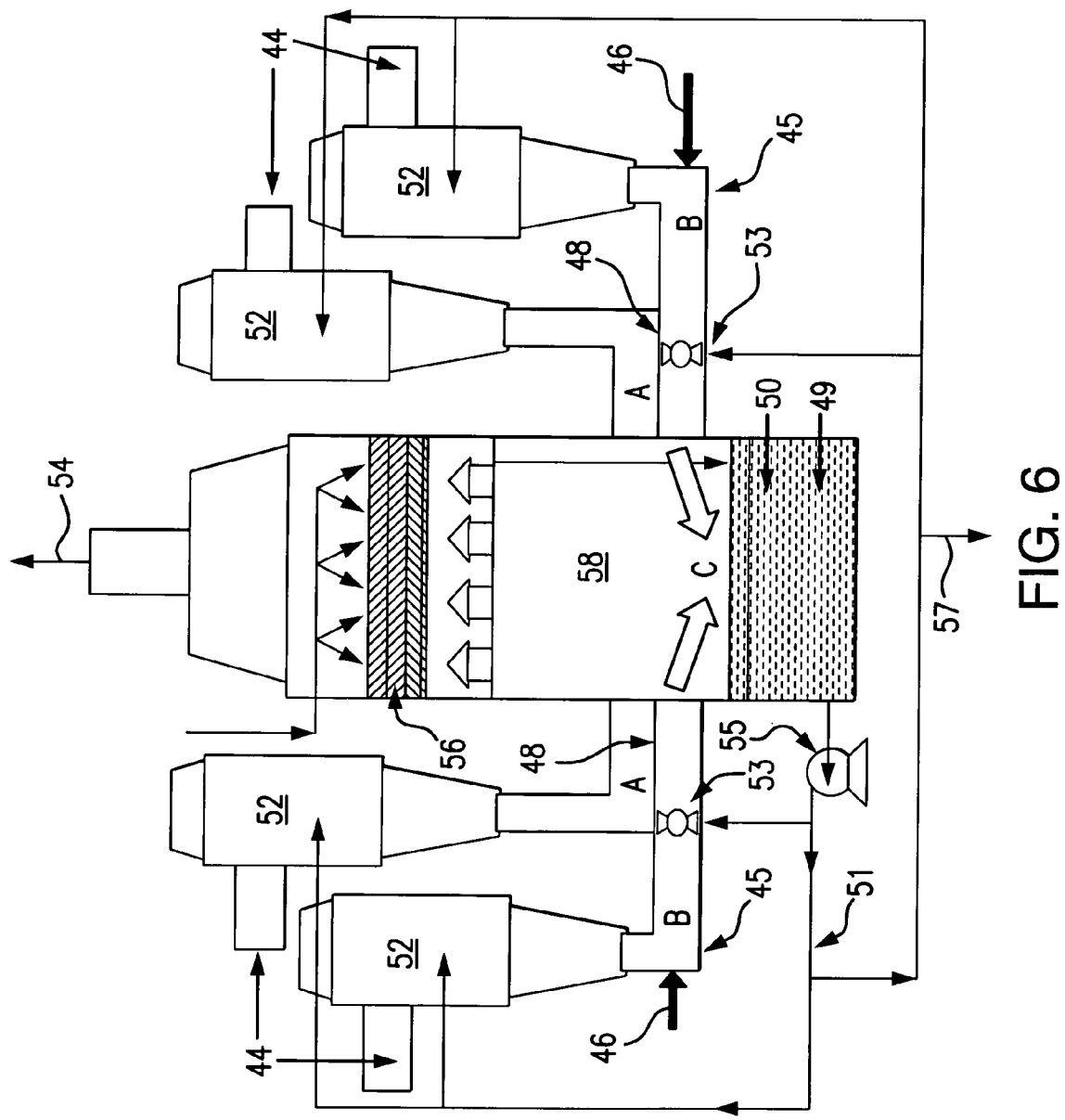
FIG. 6 is a system flow diagram of a process for nitrogen oxides removal in a multi-Venturi wet scrubbing apparatus.

Now referring to FIG. 6, there is schematically illustrated a multi-Venturi wet scrubbing apparatus. Flue gas from a fluid catalytic cracking (FCC) regenerator off gas stream 44 is treated for up to 50% nitrogen oxides removal in the illustrated example. The scrubbing apparatus consists of four Venturis for gas-liquid contacting. The FCC regenerator off gas stream 44 is scrubbed in four Venturi scrubbers, each designated by the numeral 52, prior to admixing with ozone. The FCC regenerator off gas stream is conveyed to the four Venturi scrubbers 52. Each fluid gas stream 44 is brought into contact with a scrubbing medium in the Venturis to remove acid gas including sulfur oxides, HCl, etc. and particulate matter, such as coke and catalyst fines present in the FCC regenerator off gas. Output ducts from pairs of Venturi scrubbers 52 are united to form an elbow duct. Ozone is introduced and mixed by an injection system 46 into each elbow duct. A partition 48 divides each elbow duct into Zones A and B. The injection system 46 delivers ozone into duct 45 forming Zone B of each elbow duct to treat 50% of the flue gas stream conveyed from each pair of the Venturi scrubbers 52.

Ozone from injection system 46 is mixed with the portion of gas stream in the duct 45 forming an oxidation zone, designated Zone B which has a larger volume than Zone A. Contaminants including nitrogen oxides are completely oxidized in Zone B prior to reaching aqueous medium sprays 53 at the end of the elbow duct. Both elbow ducts open into Zone C of a disengagement drum 58. Oxidized contaminants such as $N_2O_5$ and $HNO_3$ are readily captured in aqueous sprays 53. The gas streams exiting from the elbow ducts are allowed to mix in Zone C in the bottom section of the drum 58. If the residence time available in the elbow ducts is insufficient, the bottom portion of the drum 58 may also be partitioned to continue oxidation in the drum to allow nitrogen oxides absorbed in the coalescing droplets discharged from a mist eliminator 56.

The Venturi scrubbers 52 are supplied with an aqueous medium from the sump 49 via pump 55 through a header 51. The same medium is also routed to spray nozzles 53. Scrubbing medium sprayed into the gas stream also removes any remaining contaminants such as $SO_2$. The sump 49 is supplied with an aqueous medium 50 made up of water, reagents, etc. Some medium may be continuously or intermittently purged by stream 57 to maintain dissolved and suspended solids within operating range. Nitrogen oxides scrubbing is insignificantly affected by pH in the range of 2 to 14 or the presence of dissolved or suspended solids content and, therefore, other parametric controls, such as pH control and purge control, are not described in detail herein. The gas stream from the disengagement drum 58 flows through the tray and mist eliminator assembly 56 and exhausted to the atmosphere as treated gas stream 54.

In accordance with the present invention, nitrogen oxides emissions are lowered from 35 to 45 parts per million to less than 20 parts per million by treating 50% of the gas stream.

Figure 7:
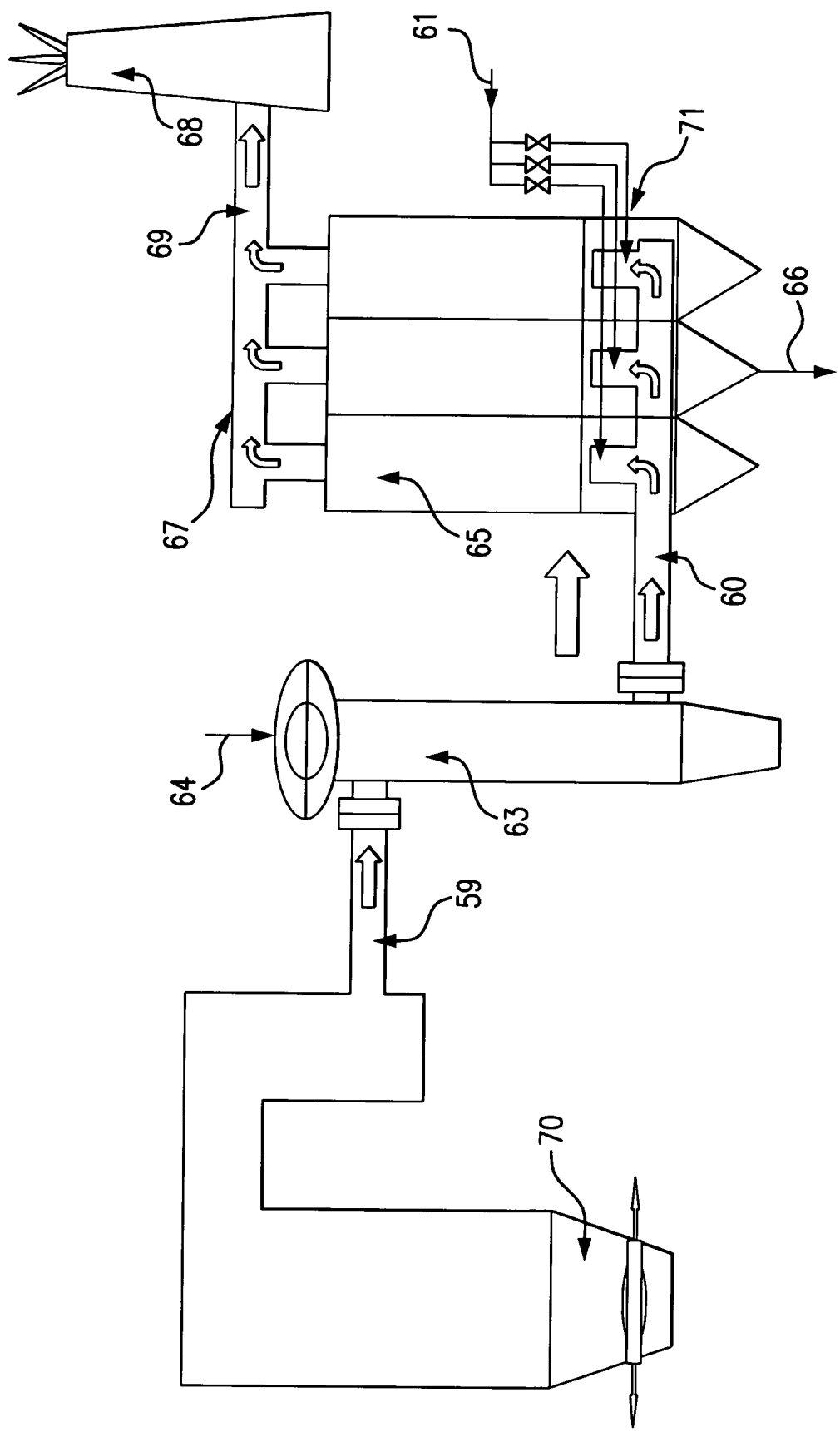
FIG. 7 is a system flow diagram of a process for nitrogen oxides removal in a dry scrubbing capture device.

In the embodiment of the present invention shown in FIG. 7, a flue gas stream 59 emitted from a combustion device 70 is scrubbed in spray dryer scrubber 63 with alkali or alkaline hydroxide, carbonate or bicarbonates or mixtures thereof in a reagent spray 64 for the removal of contaminants except nitrogen oxides. Environmental regulations mandate lowering the nitrogen oxides by 60 to 65% in two steps.

In the spray dryer scrubber 63, the hot gas stream 59 is contacted with the aqueous reagent stream 64 to remove sulfur oxides, HCl, mercury and other contaminants. The aqueous reagent stream due to heat forms finely dusted solids in the gas stream. These solids are carried with the exiting gas stream via duct 60 to a bag house 65 containing bags made of fabric filter. The bag house 65 is generally modular with multiple chambers. FIG. 7 illustrates three chambers for bag house 65. An ozone containing gas stream 61 is conveyed through a manifold 71 for mixing with a flue gas stream entering any one or all of the three chambers of bag house 65 depending on nitrogen oxides content and removal required. Assuming the flow of the flue gas stream is distributed equally, adding a slight excess of ozone in one chamber provides around 33% nitrogen oxides removal while adding ozone in any two out of the three chambers provides 66% nitrogen oxides removal. Oxidized nitrogen oxides are then adsorbed on solid reagent in the bag house 65.

Solids are retained inside the bags while the gas streams flow through the fabric filter medium. Solids retained and collected on the surface of bags eventually fall by pulsating flow and are collected in the bottom section of the bag house. Solids are periodically or continuously discharged as stream 66 for disposal.

All gas streams from the various chambers are reunited in the exhaust duct 67 forming a treated gas stream 69. On mixing the gas streams exiting various chambers in the duct, any residual ozone present is immediately consumed by the remaining nitrogen oxides in the treated gas stream 69 which is then vented to the atmosphere through stack 68.

Initially in the first stage, in order to meet the 30% emissions reduction, ozone is introduced only into one chamber of the bag house 65. At a later time, to meet the 60 to 65% reduction, gas streams in any two out of three chambers may be treated with a slight stoichiometric excess of ozone.

Figure 8:
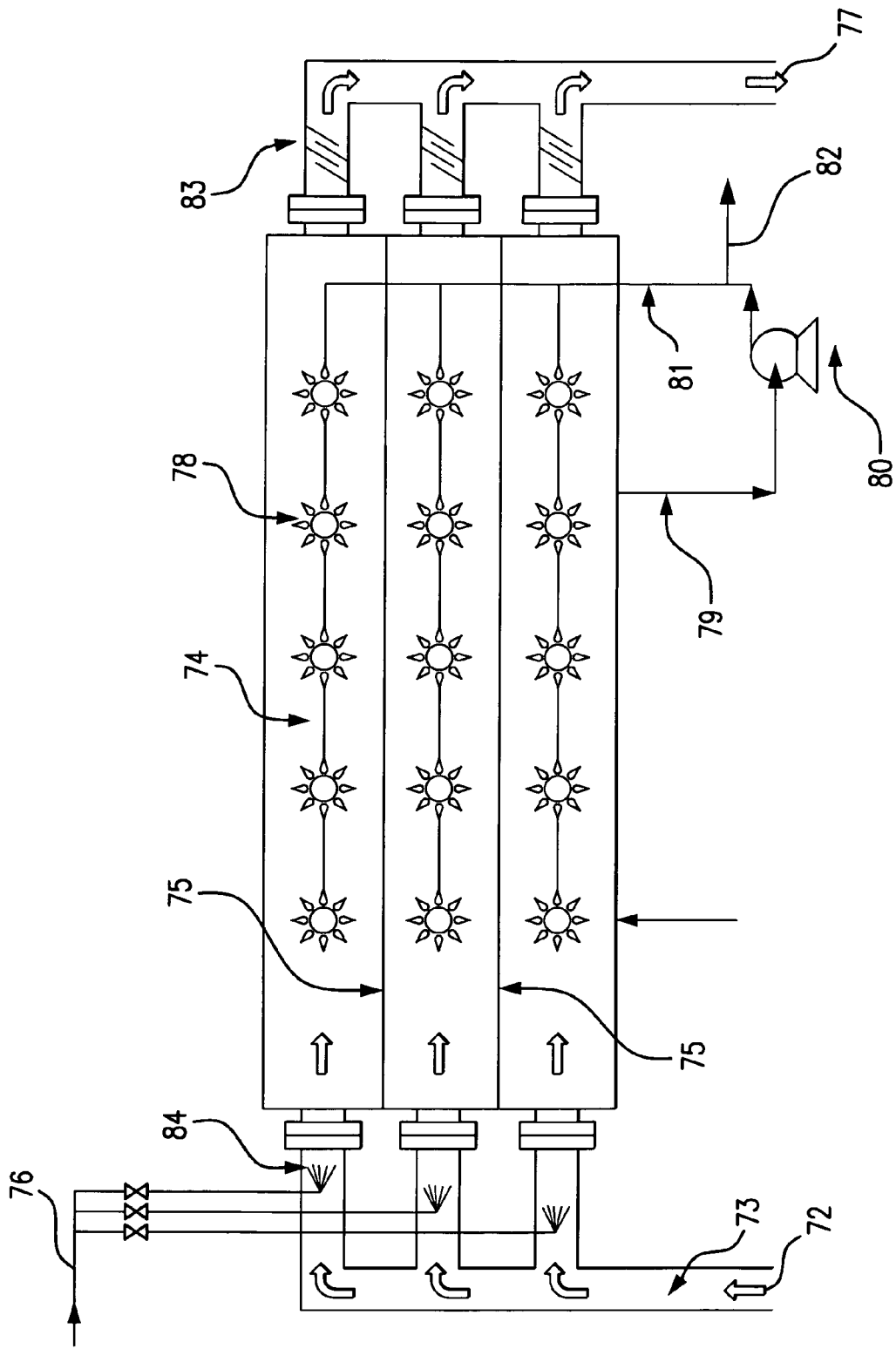
FIG. 8 is a system flow diagram of a process for nitrogen oxides removal in a partitioned horizontal spray scrubber.

Now referring to FIG. 8, there is schematically illustrated a partitioned horizontal spray scrubber. An untreated gas stream 72 is conveyed through duct manifold 73 to a horizontal wet spray scrubber 74. Two partitions 75 extending horizontally in the scrubber 74 divide the scrubber 74 into three equal chambers. The duct manifold 73 divides the gas stream 72 almost equally to three chambers. An ozone containing gas stream 76 is conveyed into manifold 73 via nozzles 84 for mixing with flue gas stream entering any one, two or all three chambers depending on $NO_x$ content and removal required.

For flue gas with 0.4 to 0.45 lb per MMBTU $NO_x$ content in the stream 72 requiring $NO_x$ reduction to 0.15 lb per MMBTU outlet in stream 77, gas entering two of the three chambers of scrubber 74 is admixed with ozone.

Ozone quickly oxidizes contaminants such as $NO_x$, Hg etc in the duct entering the scrubber prior to reaching array of nozzles 78 that deliver an aqueous medium spray. Oxidized contaminants such as $N_2O_5$ and $HNO_3$ are readily captured in aqueous sprays along with $SO_x$, HCl and other contaminants. If the scrubber volume upstream of the spray zone (spray array 78) is inadequate, the residence time requirement for almost complete removal of $NO_x$ can be compensated by using slight excess of ozone.

Scrubber 74 is sprayed with an aqueous medium 79 from a sump via pump 80 through header spray assembly 81 and the array of spray nozzles 78. The sump is supplied by an aqueous stream make up of water, reagents such as lime, limestone, soda ash, caustic, alkali, alkaline earth metal, ammonia hydroxides, carbonates, bicarbonates and mixtures thereof. Part of the scrubbing medium may be continuously or intermittently purged by stream 82 to maintain dissolved and suspended solids within the operating range. $NO_x$ scrubbing is very slightly affected by pH in the range of 2 to 14 or presence of dissolved or suspended solids content and, therefore, other parametric controls such as pH control and purge controls are not described in detail herein. In a typical limestone based wet FGD (Flue Gas Desulfurization), scrubber sump may also be fitted with air sparger to oxidize of calcium sulfite to sulfate which is not shown in FIG. 8.

The fine droplets and mist from flue gas leaving each of three chambers are removed in a mist removal device 83, and gas streams are reunited in the duct forming treated gas stream 77. Any residual ozone present in the various chambers is immediately consumed by remaining $NO_x$ in the treated gas stream 77.

With the present invention, consumption of ozone is 25% less in lowering $NO_x$ content from 0.45 lb/MMBTU to 0.15 lb/MMBTU compared to what is reported in the prior art (U.S. Pat. Nos. 6,162,409; 5,206,002; 6,649,132; and 7,303,735) under identical conditions.

In an another example, $NO_x$ emissions from a bio mass fired boiler is required to be lowered in a first stage from 0.7 lbs/MMBTU to 0.45 lbs and finally in the second stage to less than 0.3 lbs/MMBTU. Environmental regulations do not require scrubbing of any other pollutants. The proposed solution provides flexibility in stage wise reduction of $NO_x$ by treating required amount of gas stream with slight stoichiometric excess of ozone at each stage.

Figure 9:
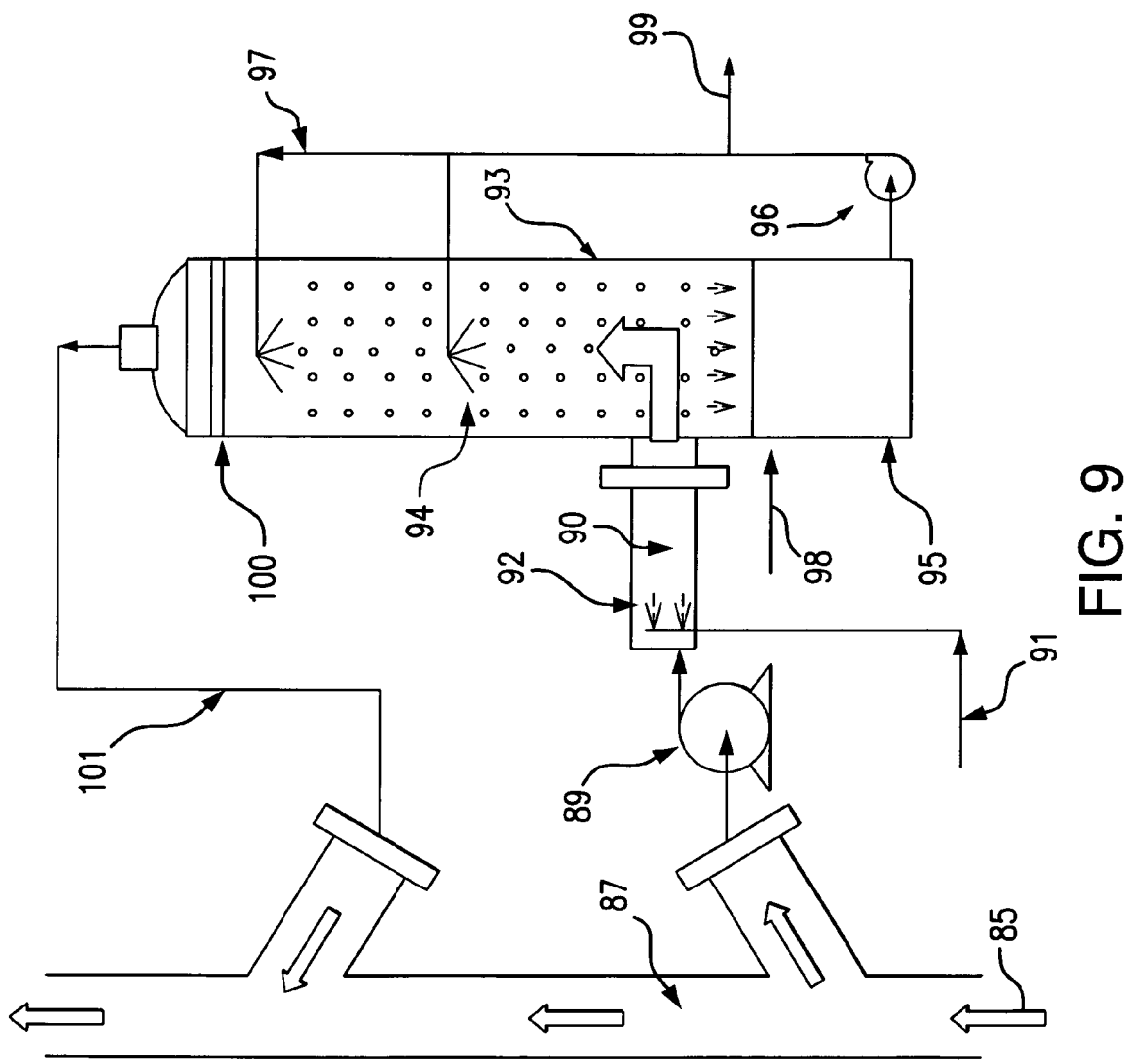
FIG. 9 is a system flow diagram of a process for nitrogen oxides removal by scrubbing a portion of a gas stream.

Referring to the embodiment shown in FIG. 9, there is shown schematically a device for partial scrubbing of a flue gas stream. An untreated gas stream 85 is conveyed through main gas header 87. A portion of the gas stream in header 87 is diverted by a fan 89 into a duct 90 is almost directly proportional to $NO_x$ removal requirements. For 50% $NO_x$ removal, 50% gas stream 85 is directed by fan 89 into the duct 90. The flow of the gas is varied by a variable frequency drive control of the fan 89. Ozone supplied from a source 91 is conveyed to ozone injector nozzles 92 where ozone is mixed with the gas stream in duct 90. The amount of ozone injected is in slight excess of stoichiometric requirement based on amount of $NO_x$ present in this portion of the gas stream. Stoichiometric requirement is 1.5 moles of ozone per mole of NO content and 0.5 moles of ozone per mole of $NO_2$ content in this portion of the flue gas stream.

The gas stream mixed with ozone is conveyed from duct 90 into a column scrubber 93. The ozone in duct 90 quickly oxidizes contaminants such as $NO_x$, Hg etc. in the flue gas stream entering the scrubber 93 prior to reaching an aqueous spray from nozzles 94 vertically spaced apart in scrubber 93. Oxidized contaminants such as $N_2O_5$ and $HNO_3$ are readily captured in the aqueous sprays from nozzles 94 along with any other contaminants, if present.

Scrubber 93 is supplied with an aqueous medium from scrubber sump 95 via recirculation 96 through a spray header assembly 97 to the array of spray nozzles 94 in scrubber 93. Sump 95 is supplied with an aqueous medium 98 made up with water, reagents such as lime limestone, soda ash, caustic, alkali, alkaline earth metal, ammonia hydroxides, carbonates, bicarbonates and mixtures thereof. Part of the scrubbing medium 98 may be continuously or intermittently purged by a stream 99 to maintain dissolved and suspended solids within the operating range. $NO_x$ scrubbing is very slightly affected by pH in the range of 2 to 14 or presence of dissolved or suspended solids content and therefore, other parametric controls such as pH control and purge controls are not described in detail herein.

Fine droplets and mist from the treated flue gas exiting the scrubber 93 after the aqueous sprays are removed by a mist removal device 100. Thereafter, the treated gas stream 101 is reunited with the untreated part of the flue gas stream 85 in the gas header 87. On mixing treated gas stream 101 with untreated gas stream 85 any residual ozone present is immediately consumed by $NO_x$ in the untreated portion of gas stream 85.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

I claim:

1. A method for the partial removal of contaminants from a process gas stream comprising the steps of:
conveying a stream of untreated process gas through an inlet of a scrubber into a scrubbing zone of the scrubber,
dividing the gas stream at the scrubber inlet free of any physical obstruction in the scrubber extending the length of the scrubber from the inlet to an outlet into a plurality of process gas streams partitioned from one another,
feeding ozone into contact with selected ones of the partitioned gas streams in the scrubber to oxidize contaminants in the partitioned gas streams,
removing the oxidized contaminants from the selected partitioned gas stream, and
recombining the selected partitioned gas streams substantially free of contaminants with the remaining partitioned gas streams containing contaminants.

2. A method as set forth in claim 1 which includes,
conveying the process gas stream into the inlet of a horizontal wet spray scrubber.

3. A method as set forth in claim 1 which includes,
distributing the process gas stream entering the scrubber inlet evenly throughout the width of the scrubber inlet.

4. A method as set forth in claim 1 which includes,
partitioning the process gas stream entering the scrubber at the inlet into a plurality of separated rows of process gas streams extending from the inlet to the outlet of the scrubber.

5. A method as set forth in claim 1 which includes,
positioning rows of scrubbing nozzles in spaced relation extending from the scrubber inlet to the scrubber outlet across the width of the scrubber, and
partitioning the process gas stream into a flow pattern forming a plurality of spaced apart rows of gas streams aligned with the rows of scrubbing nozzles.

6. A method as set forth in claim 5 which includes,
positioning the rows of scrubbing nozzles in parallel spaced relation across the width of the scrubber and extending the length of the scrubber from the inlet to the outlet, and
partitioning the flow of process gas through the scrubber in a flow pattern of partitioned gas streams aligned with the parallel rows of scrubbing nozzles.

7. A method as set forth in claim 1 which includes,
treating a preselected percentage of the process gas stream entering the scrubber by feeding ozone into contact with selected ones of the partitioned gas streams to oxidize contaminants in the partitioned gas streams.

8. A method set forth in claim 7 which includes,
spraying the treated process gas stream with an aqueous medium emitted from rows of scrubbing nozzles aligned with selected rows of partitioned gas streams containing oxidized contaminants.

9. A method as set forth in claim 1 which includes,
positioning nozzles for supplying ozone to the scrubber oppositely of the selected partitioned gas streams for oxidation of a preselected percentage of the contaminants in the process gas stream.

10. A method as set forth in claim 1 which includes,
capturing the oxidized contaminants removed from the selected partitioned gas streams in a capture device selected from the group consisting of a fabric filter, wet and dry electrostatic precipitators, a wet scrubber, a dry scrubber, a bag house, condensing surfaces, and a mist separator.

11. A method for the partial removal of contaminants from a process gas stream comprising the steps of:
conditioning the process gas stream emitted from a combustion process,
conveying the conditioned process gas stream to an inlet of a scrubber,
distributing the process gas stream at the inlet free of any physical obstruction in the scrubber into a flow pattern forming a plurality of partitioned gas streams,
injecting ozone into one or more of the partitioned gas streams to mix ozone with the contaminants in a preselected percentage of the entire process gas stream,
oxidizing the contaminants in the selected partitioned gas stream by mixing with ozone,
capturing the oxidized contaminants in a separation device to remove the contaminants from the selected partitioned gas stream, and
reuniting the selected partitioned gas stream substantially free of contaminants with the remaining partitioned gas streams containing contaminants.

12. A method as set forth in claim 11 which includes,
dividing the conditioned process gas stream at the scrubber inlet into the partitioned gas streams extending the length of the scrubber from the inlet to the outlet.

13. A method as set forth in claim 11 which includes,
distributing the process gas stream entering an inlet of a scrubber evenly throughout the width of the scrubber into the plurality of partitioned gas streams containing contaminants, and
maintaining a flow pattern of partitioned gas streams from the inlet through a chamber of the scrubber to an outlet thereof.

14. A method as set forth in claim 11 which includes,
mixing a preselected percentage of the partitioned gas stream with ozone corresponding to the selected percentage of $NO_x$ to be removed from the gas stream.

15. A method as set forth in claim 11 which includes,
removing the oxidized contaminants from the partitioned gas stream by contacting the oxidized contaminants with an aqueous scrubbing medium.

16. Apparatus for the partial removal of contaminants from a process gas stream comprising:
a scrubber having an inlet and an outlet with a chamber positioned there between,
said chamber being free of any obstructions diverting the flow of the process gas stream from said inlet through said chamber to said outlet,
a gas distributor positioned at said inlet section for receiving and evenly distributing the process gas stream across said inlet entering said chamber into a flow pattern of separated gas streams extending from said inlet to said outlet,
a source of ozone positioned at said inlet for injecting ozone into selected ones of said separated gas streams to oxidize a preselected percentage of the gas stream flowing through said chamber,
a capture device positioned in said chamber for receiving the oxidized gas streams before exiting through said outlet to remove the oxidized contaminants from the gas streams, and said outlet receiving the gas stream free of contaminants for mixing with the gas stream containing contaminants.

17. Apparatus for the partial removal of contaminants from a process gas stream as set forth in claim 16 in which, said separated gas streams are divided by said gas distributor into a plurality of partitioned gas streams spaced apart in substantially parallel relation extending from said inlet through said chamber to said outlet.

18. Apparatus for the partial removal of contaminants from a process gas stream as set forth in claim 17 which includes, a preselected number of nozzles positioned downstream of said gas distributor in said chamber and positioned oppositely of selected ones of said separated gas streams for injecting ozone into said selected gas streams to oxidize a preselected percentage of the contaminants present in the process gas stream entering said scrubber.

\* \* \* \* \*